UNITED STATES PATENT OFFICE.

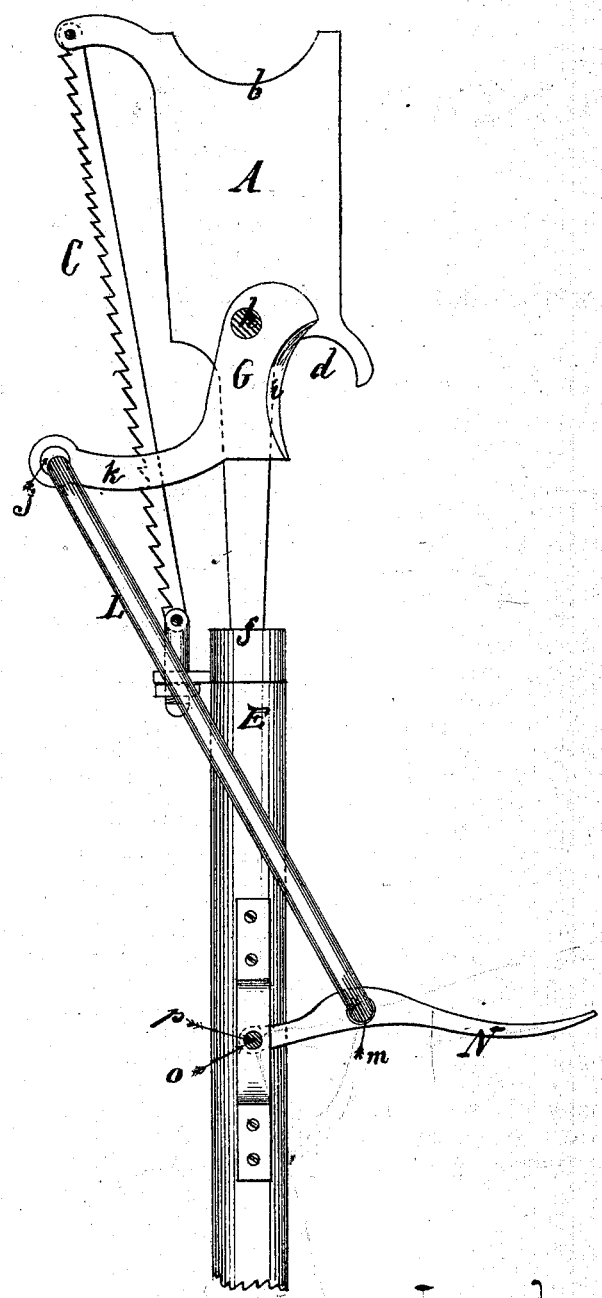

ROBERT BARTLY, OF EDGEWOOD, ILLINOIS.

IMPROVEMENT IN PRUNING-IMPLEMENTS.

Specification forming part of Letters Patent No. 146,744, dated January 27, 1874; application filed November 29, 1873.

*To all whom it may concern:*

Be it known that I, ROBERT BARTLY, of Edgewood, Effingham county, State of Illinois, have invented certain Improvements in Pruning-Instruments, of which the following is a specification:

The object of my invention is to provide for an attachment to a pruning-instrument, by aid of which branches of trees may be cut off, by a person standing on the ground, with ease and facility without injuring the tree.

My invention consists in the shaping of a piece of iron or steel in such a manner that a chisel-cutter is formed at the top of the same, and a fixed concave cutter near the bottom, with a movable concave cutter pivoted to the side of the former, and operated by a rod and handle or lever. A saw is attached to one side of the implement, and held thereto by two arms, one of which is fastened to the implement itself, the other to the handle. A set-screw and threaded connecting-rod serve to give the saw the required tension.

In order to describe my invention more fully, I refer to the accompanying drawing forming a part of this specification, representing a side view of a pruning-instrument embodying my invention.

A is the pruning-instrument, with the cutter $b$ at the top, a saw, C, at the side, and the concave cutter $d$ at the lower part. E is a pole, to which the pruning-instrument is fastened at $f$. G is the movable cutter, pivoted, at $h$, to the pruning-instrument A, and also provided with a concave edge, $i$. $j$ is a hole in the end of the arm $k$, in which is pivoted the end of the rod L, the other end of which is pivoted in the hole $m$ in the handle or lever N, which is pivoted, by the end $o$, to the pole E at $p$, thus serving as a lever for moving back and forth the movable cutter G.

Having thus described my invention, I desire to claim—

The combination of the pruning-implement A, having the chisel-cutter $b$ at its top, and a fixed concave cutter, $d$, near the bottom, with the movable concave cutter G pivoted at $h$, and operated by the rod L and handle or lever N, together with the saw C and the pole E, all constructed, arranged, and operating as described and shown, for the purpose set forth.

ROBERT BARTLY.

Witnesses:
GEO. M. KINDER,
A. GRANGER.